(12) United States Patent
Wang et al.

(10) Patent No.: US 12,124,800 B2
(45) Date of Patent: Oct. 22, 2024

(54) COMPUTERIZED SYSTEMS AND METHODS FOR HIERARCHICAL STRUCTURE PARSING AND BUILDING

(71) Applicant: Robert Bosch GmbH, Stuttgart (DE)

(72) Inventors: Bingqing Wang, San Jose, CA (US); Ishan Dindorkar, Indore (IN); Lars Franke, Untergruppenbach (DE); Zhe Feng, Mountain View, CA (US)

(73) Assignee: Robert Bosch GmbH (DE)

( * ) Notice: Subject to any disclaimer, the term of this patent is extended or adjusted under 35 U.S.C. 154(b) by 302 days.

(21) Appl. No.: 17/857,771

(22) Filed: Jul. 5, 2022

(65) Prior Publication Data

US 2024/0012995 A1    Jan. 11, 2024

(51) Int. Cl.
| | | |
|---|---|---|
| *G06F 40/20* | (2020.01) | |
| *G06F 18/2137* | (2023.01) | |
| *G06F 18/22* | (2023.01) | |
| *G06F 40/14* | (2020.01) | |
| *G06F 40/279* | (2020.01) | |
| *G06N 3/044* | (2023.01) | |
| *G06N 3/045* | (2023.01) | |

(52) U.S. Cl.
CPC ...... *G06F 40/279* (2020.01); *G06F 18/21375* (2023.01); *G06F 18/22* (2023.01); *G06F 40/14* (2020.01); *G06N 3/044* (2023.01); *G06N 3/045* (2023.01)

(58) Field of Classification Search
CPC ...... G06F 40/20; G06F 40/279; G06F 40/295; G06N 3/042
See application file for complete search history.

(56) References Cited

U.S. PATENT DOCUMENTS

| | | | |
|---|---|---|---|
| 11,573,996 B2 * | 2/2023 | Rollings | G06F 40/295 |
| 2020/0320370 A1 * | 10/2020 | Khatri | G06N 3/044 |
| 2021/0182328 A1 * | 6/2021 | Rollings | G06F 40/30 |
| 2023/0061731 A1 * | 3/2023 | Sengupta | G06F 40/284 |

OTHER PUBLICATIONS

Carbonell, Jaime, et al., "The Use of MMR, Diversity-Based Reranking for Reordering Documents and Producing Summaries," SIGIR Forum (ACM Special Interest Group on Information Retrieval) 1998, Melbourne Australia, 2 pages.
Rausch, Johannes, et al., "DocParser: Hierarchical Document Structure Parsing from Renderings," Association for the Advancement of Artificial Intelligence (www.aaai.org), 2021, 11 pages.
Zheng, Shuyi, et al., "Template-Independent News Extraction Based on Visual Consistency," Association for the Advancement of Artificial Intelligence (www.aaai.org), 2007, 6 pages.

* cited by examiner

*Primary Examiner* — Daniel Abebe
(74) *Attorney, Agent, or Firm* — Dickinson Wright PLLC (57) ABSTRACT

Disclosed are systems and methods for a computerized framework that provides a document structure parsing system for requirement engineering documents, where the logical structure of the text is not available, and is to be rebuilt based on the raw textual content. The framework approaches the build of the logical structure according to two phases. The first phase involves creating a list of list of text snippets from the raw text, where sequence labeling is adopted to re-segment and merge initially segmented text snippets. The second phase involves the framework executing computerized techniques including embedding adaptation approach, a hierarchy structure rebuilt algorithm, and a requirement text selection strategy to rebuild the hierarchy structure.

20 Claims, 9 Drawing Sheets

System Architecture:
The A system should support both B and C function when signal D is activated.

Signal Values:
 0 Signal_ABC
 1 Signal_DEF

Response: 03 42 56 Bytes of Data
Byte 1 $03 = Response Service Id "Service_ABC"
Byte 2-3 $42 56 = Motorcycle Engine Data
Byte 4-5 Motorcycle Engine Data
 Range: 0x0000-0xFFFF
Byte 6-7 Motorcycle Mileage Data Range: 0x0000-0xFFFF Note:
Detailed information can be found in reference Ref_ABC and Ref_DEF.

COMPUTERIZED SYSTEMS AND METHODS FOR HIERARCHICAL STRUCTURE PARSING AND BUILDING

TECHNICAL FIELD

The present disclosure generally relates to mechanisms for logical document processing for electronic documents, and more particularly, to an improved computerized framework for document structure parsing for requirement engineering document building.

BACKGROUND

Hierarchy document structure parsing is a tool used for information extraction and other down-streaming tasks. This enables computerized systems to parse the raw text of the document and obtain the hierarchy structural layout of the document.

However, when the document and/or information related to the document are stored, many databases store the textual data with pure textual surface form, which results in the loss of the internal logical structure. This leads to unstructured textual data, which many conventional systems are unable to process, thereby causing processing errors, unforeseen hurdles and/or delays when computerized applications, systems and/or platforms attempt to recreate the document and/or perform computerized operations based on the document.

SUMMARY

In requirement engineering, unstructured textual data is commonly seen, where the same requirement text is edited by multiple hands to make the specification informative, precise, and easy to follow. Engineers, either developer engineers or test engineers, both write and store the raw text in the requirement management system, where the logical structure is lost.

To parse for the document structure, traditional approaches are mainly conducted on a semi-structured textual document, such as Hypertext Mark-up Language (HTML) or a special formatted document with geo-layout information, such as a Portable Document Format (PDF). Compared with traditional approaches, the raw text can only provide limited linguistic features, while semi-structure or geo-layout document still can provide some structural or visual information of the text in the document. However, traditional approaches focus more at the pure supervised learning framework, supported by large amount of high quality annotation data, which typically requires more manual effort, especially when transferred to new domain.

The disclosed systems and method provide a novel computerized framework that addresses existing shortcomings, among others, by providing for document structure parsing for requirement engineering documents, where the logical structure of the text is not available, and is to be rebuilt based on the raw textual content.

According to some embodiments, the disclosed systems and methods can operate as a two (2) phased process to rebuild the document structure based on deep learning. In some embodiments, phase I (or first phase, used interchangeably) operates to re-segment or adjust the original segment of the textual content, while phase II (or second phase, used interchangeably) operates to predict the pairwise text snippets, and rebuild the hierarchy structure based on the prediction. According to some embodiments, phase II can involve the operations functionality related to embedding adaptation, a hierarchy structure rebuild and a requirement text selection.

In some embodiments, an adaptive embedding approach is implemented to handle the domain-specific terms, which reassigns the emphasis on word-level and char-level embeddings in a stacked embedding setting based on the amount of out-of-vocabulary (OOV) words in the text snippet.

In some embodiments, a hierarchy structure rebuild (or rebuilt) algorithm is implemented with support from a prediction model that can classify pairwise text snippets as Parent-Child, Sibling or None relations.

In some embodiments, the framework further involves training the prediction model, which can involve a requirement text selection approach that is implemented to alleviate the annotation burden in high redundant text collection. According to some embodiments, the selection operation considers both the relevance and diversity of the requirements, where Prototype-Requirement Similarity and Requirement-Requirement Similarity can be utilized in a Maximal Margin Relevance (MMR) paradigm.

Thus, as discussed in more detail below, phase II involves the instant framework executing computerized techniques including embedding adaptation approach, a hierarchy structure rebuilt algorithm, and a requirement text selection strategy to rebuild the hierarchy structure.

While discussion herein will be focused on requirement engineering documents, it should not be construed as limiting, as any type of known or to be known electronic document or electronic file (or message) based on a logical structure or hierarchical model can be subject to the disclosed systems and methods without departing from the scope of the instant disclosure.

According to some embodiments, a method is disclosed for document structure parsing for requirement engineering document building.

In accordance with one or more embodiments, the present disclosure provides a non-transitory computer-readable storage medium for carrying out the above mentioned technical steps. The non-transitory computer-readable storage medium has tangibly stored thereon, or tangibly encoded thereon, computer readable instructions that when executed by a device, cause at least one processor to perform a method that performs document structure parsing for requirement engineering document building.

In accordance with one or more embodiments, a system is provided that comprises one or more computing devices and/or apparatus configured to provide functionality in accordance with such embodiments. In accordance with one or more embodiments, functionality is embodied in steps of a method performed by at least one computing device and/or apparatus. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or $2^{nd}$, $3^{rd}$, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

Figure 1:
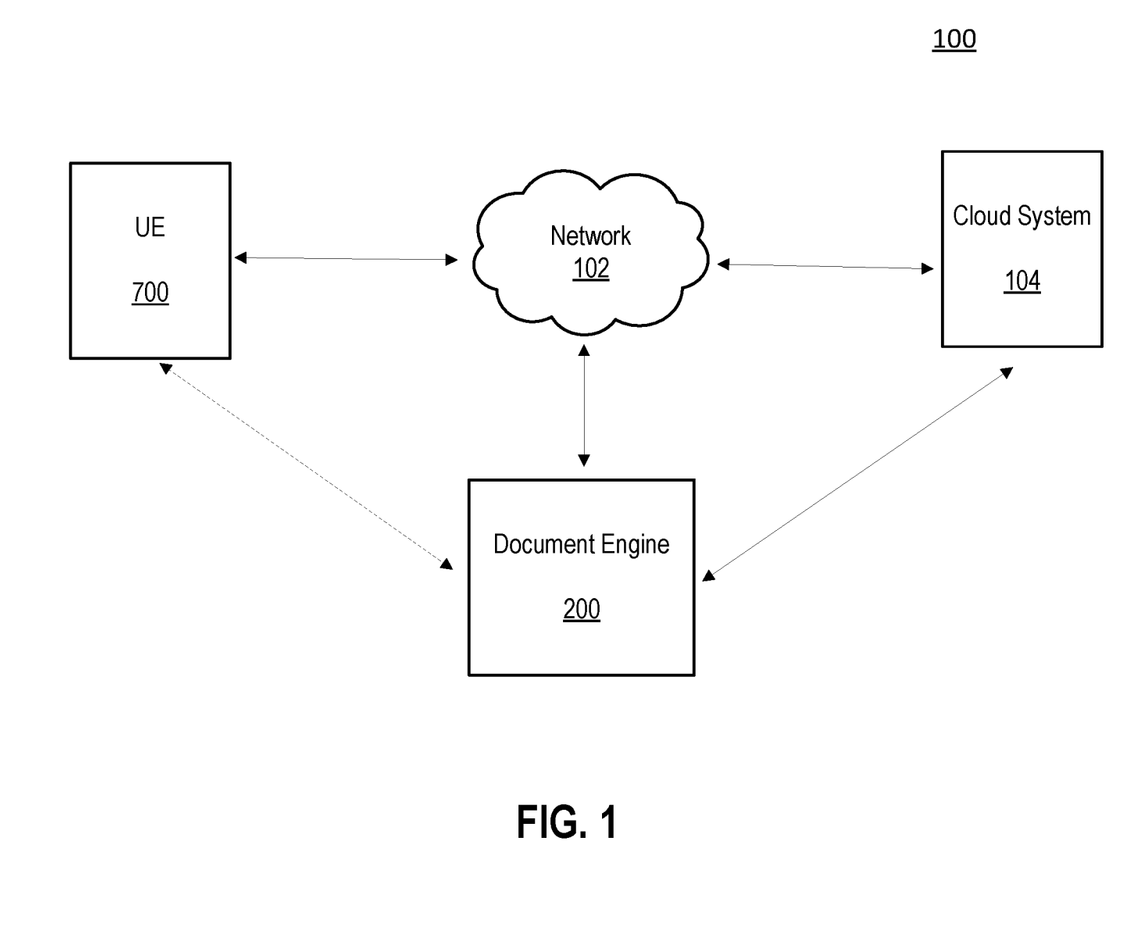
FIG. 1 is a block diagram of an example configuration within which the systems and methods disclosed herein could be implemented according to some embodiments of the present disclosure.

With reference to FIG. 1, system (or framework) 100 is depicted which includes UE 800 (e.g., a client device), network 102, cloud system 104 and document engine 200. UE 800 can be any type of device, such as, but not limited to, a mobile phone, tablet, laptop, personal computer, sensor, Internet of Things (IoT) device, autonomous machine, and any other device equipped with a cellular or wireless or wired transceiver. Further discussion of UE 800 is provided below at least in reference to FIG. 8.

Network 102 can be any type of network, such as, but not limited to, a wireless network, cellular network, the Internet, and the like (as discussed above). As discussed herein, network 102 can facilitate connectivity of the components of system 100, as illustrated in FIG. 1.

Cloud system 104 can be any type of cloud operating platform and/or network based system upon which applications, operations, and/or other forms of network resources can be located. For example, system 104 can correspond to a service provider, network provider, content provider and/or medical provider from where services and/or applications can be accessed, sourced or executed from. In some embodiments, cloud system 104 can include a server(s) and/or a database of information which is accessible over network 102. In some embodiments, a database (not shown) of system 104 can store a dataset of data and metadata associated with local and/or network information related to a user(s) of UE 800, user(s) and the UE 800, and the services and applications provided by cloud system 104 and/or document engine 200.

Document engine 200, as discussed below in more detail, includes components for performing document structure parsing for requirement engineering document building. Embodiments of such functionality and the novel operational configuration that provide such advanced security are discussed infra.

According to some embodiments, document engine 200 can be a special purpose machine or processor and could be hosted by a device on network 102, within cloud system 104 and/or on UE 800. In some embodiments, engine 200 can be hosted by a peripheral device connected to UE 800.

According to some embodiments, document engine 200 can function as an application provided by cloud system 104. In some embodiments, engine 200 can function as an application installed on UE 800. In some embodiments, such application can be a web-based application accessed by UE 800 over network 102 from cloud system 104 (e.g., as indicated by the connection between network 102 and engine 200, and/or the dashed line between UE 800 and engine 200 in FIG. 1). In some embodiments, engine 200 can be configured and/or installed as an augmenting script, program or application (e.g., a plug-in or extension) to another application or program provided by cloud system 104 and/or executing on UE 800.

Figure 2:
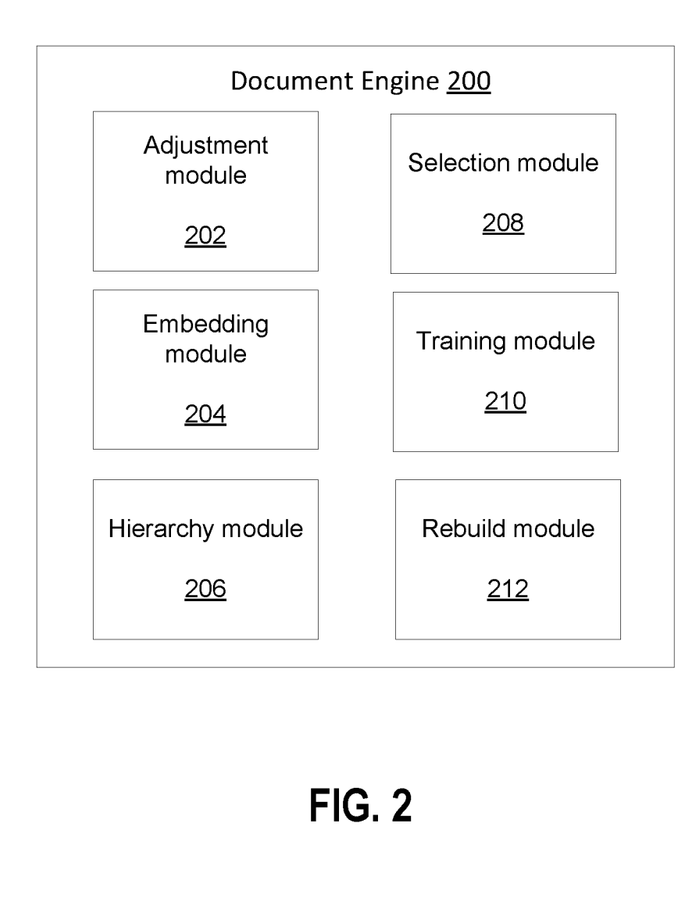
FIG. 2 is a block diagram illustrating components of an exemplary system according to some embodiments of the present disclosure.

As illustrated in FIG. 2, according to some embodiments, document engine 200 includes adjustment module 202, embedding module 204, hierarchy module 206, selection module 208, training module 210 and rebuild module 212. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
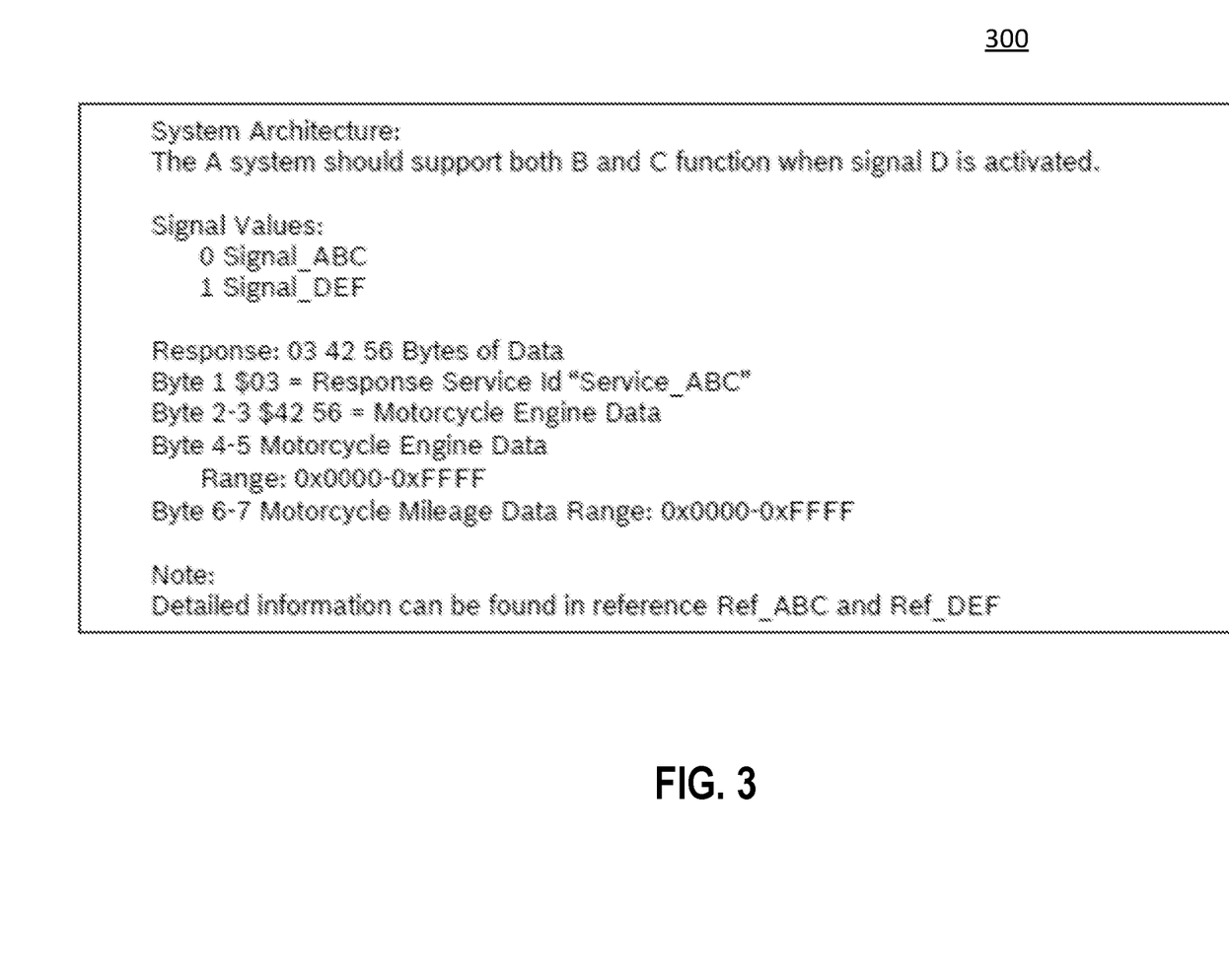
FIG. 3 illustrates an example electronic engineering document.

Turning to FIG. 3, depicted is an example of an engineering requirement document 300 (or requirement document or document, used interchangeably). By way of background, requirement engineering is the process of documenting and maintaining requirements in the engineering design process. Such documents can include, but are not limited to, OOV terms, domain-specific terms and/or expressions used for engineering, a hierarchy document structure, and a high redundancy within the document of terms, expressions and other forms of data to be used during the design process.

For purposes of this disclosure, OOV can refer to or include, but is not limited to, a numerical expression, values, symbols, domain specific terms and expressions used in the requirement documents, and the like. Such terms and/or expressions can be considered as OOV words in traditional language processing.

A hierarchy structure refers to/includes requirement text that are often organized as a recursive list, as illustrated in document 300 of FIG. 3. In document 300, the first level nodes are "System Architecture", "Signal Values", "Response" and "Note". Each node could be further parsed. For example, "Note" refers to the title, and the next line following the title is the textual content of "Note". In some embodiments, a requirement document can have the reference document title or link in the "Note" section—thus, in some embodiments, a proper data structure analysis should be conducted here first then proceed to the rest of the document's structure.

According to some embodiments, a complete requirement can be composed of multiple fields of different lengths and content. The example document 300 depicts a field with rich textual content, which verbally describes the requirement content. In some embodiments, such description can be divided into multiple sections (System Architecture, Signal Values, Response, and Note, for example), where each section can have subtitle or sublist recursively—for example: Response->Byte 4-5->Range: 0x0000-0xFFFF.

With regard to redundancy within a requirement document, many requirements follow a similar writing pattern. For example, in the "response" section of example document 300, the byte value and allocation of bit position in the byte can be different, but the document structure and other part of the document could be very similar (to a threshold level) (or follow a similar pattern).

As discussed below with reference to FIGS. 4-7, the disclosed framework is configured to address and/or leverage these characteristics of the requirements document by implementing the disclosed two (2) phased process to rebuild the document structure. In some embodiments, deep learning can be utilized. In some embodiments, human-in-loop annotation(s) can be utilized or adopted to build up and/or create training data in a supervised learning setting.

Figure 4:
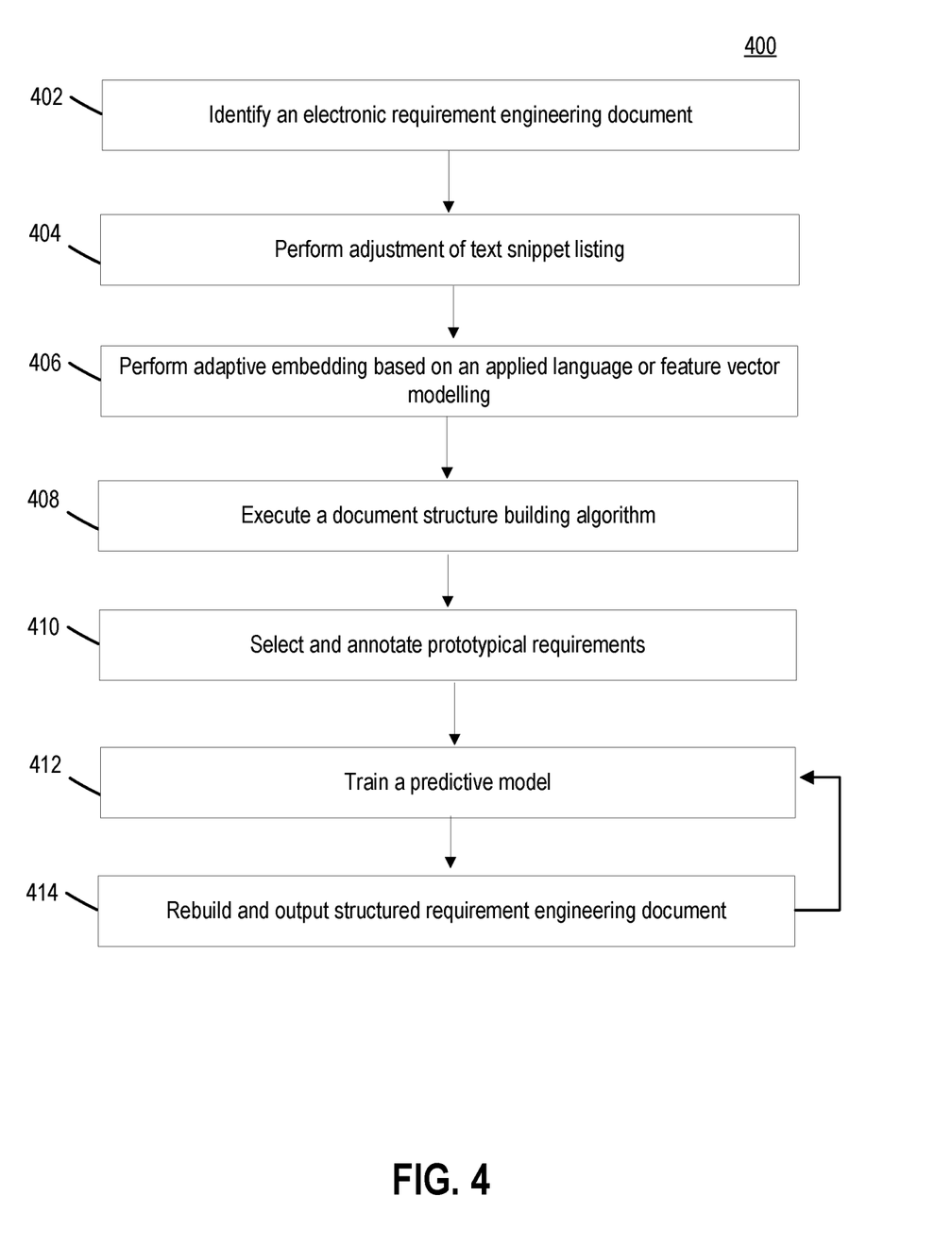
FIG. 4 illustrates an exemplary data flow according to some embodiments of the present disclosure.

Turning now to FIG. 4, Process 400 is disclosed which details non-limiting example embodiments for a computerized framework that provides for document structure parsing system for requirement engineering documents, where the logical structure of the text is not available, and is to be rebuilt based on the raw textual content. The framework approaches the build of the logical structure according to two phases. The first phase involves creating list of text snippets from the raw text, where sequence labeling is adopted to re-segment and merge initially segmented text snippets. The second phase involves the framework executing computerized techniques including embedding adaptation approach, a hierarchy structure rebuilt algorithm, and a requirement text selection strategy to rebuild the hierarchy structure.

According to some embodiments, Steps 402 and 404 (and sub-steps 502-504 of FIG. can be performed by adjustment module 202 of document engine 200; Step 406 can be performed by embedding module 204; Step 408 can be performed by hierarchy module 206; Step 410 (and sub-steps 702-712 of FIG. 7) can be performed by selection module 208; Step 412 can be performed by training module 210; and Step 414 can be performed by rebuild module 212.

Process 400 begins with Step 402 where engine 200 identifies an engineering requirement document (ERD). As discussed above, an ERD is an electronic document that includes a statement describing the goal and purpose of a new physical, digital and/or physical and digital component. Unlike a product requirements document (PRD), which informs engineers what they need to build, an ERD specifies why a part is being built and how its design fuels its purpose.

As mentioned above, while the discussion herein will focus on ERDs, it should not be construed as limiting, as any other type of electronic document, such as a PRD, can be utilized as a basis for the processing discussed herein without departing from the scope of the instant disclosure.

According to some embodiments, Step 402's identification can be based on or subject to a document request, upload, share, download, post to a network resource location, during the creation of the document, and/or any other form of activity where an ERD is required for some form of electronic processing.

Figure 5A:
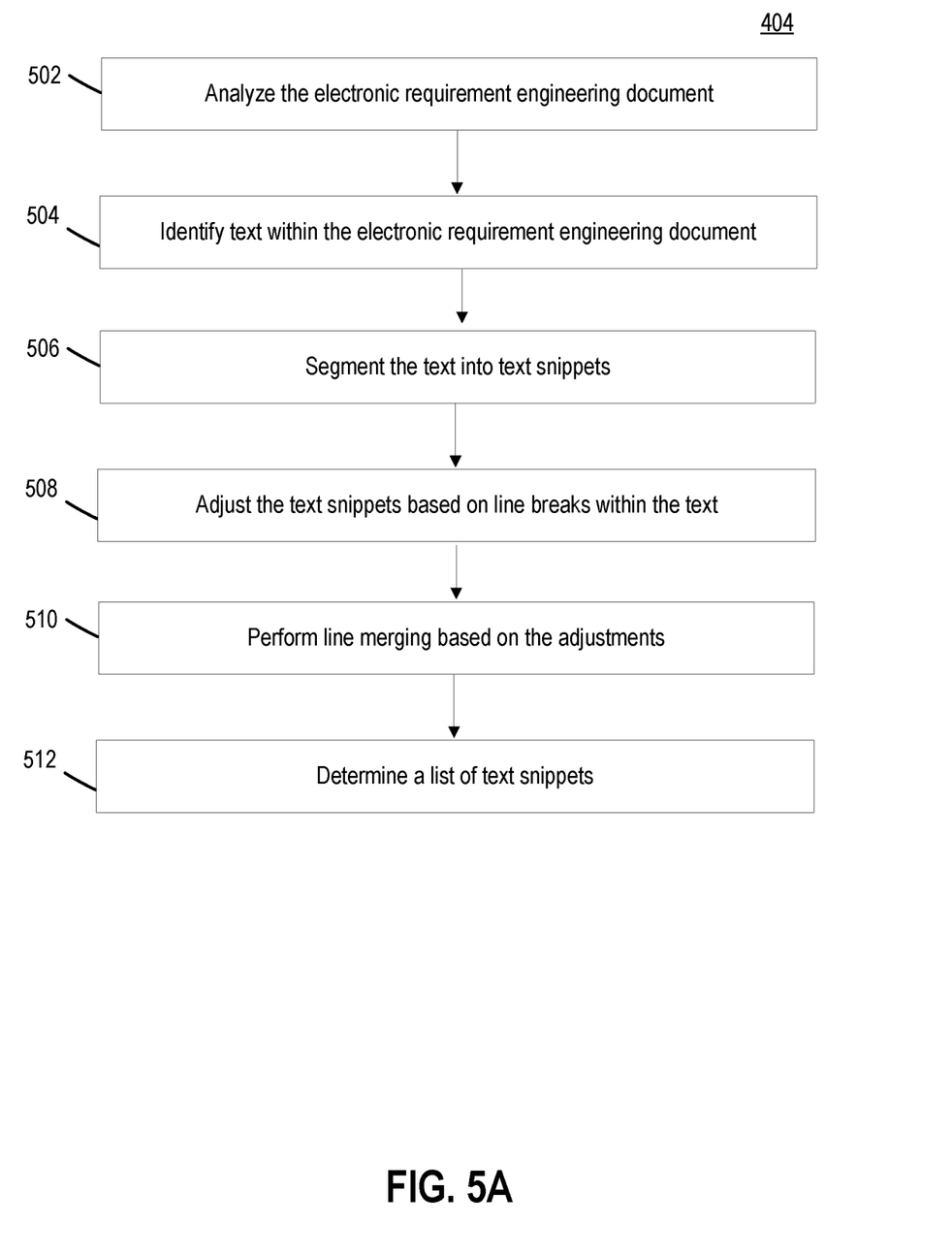
FIG. 5A illustrates an exemplary data flow according to some embodiments of the present disclosure.

In Step 404, engine 200 performs adjustment processing of a text snipping listing associated with the ERD. According to some embodiments, the processing of Step 404 is detailed with regard to FIG. 5. For purposes of discussion, Step 404 and the sub-steps of FIG. 5 correspond to Phase I of the framework's processing.

Turning to FIG. 5, the processing begins with Step 502 where engine 200 analyzes the ERD by executing computational analysis techniques on the ERD. In some embodiments, such techniques can include any type of known or to be known classifier, or parsing, extracting, language processing, data mining, and the like algorithm, mechanism or technology. In some embodiments, engine 200 can execute any type of known or to be known machine learning (ML) or artificial intelligence (AI) algorithm to analyze the ERD, which can include, but is not limited to, computer vision, neural networks, natural language processing (NLP), Bidirectional Long short-term memory—conditional random field (BiLSTM-CRF), CRF, and the like.

As a result of Step 502's processing, engine 200 can perform Step 504 where text within the ERD is identified. In some embodiments, Step 504's processing can enable identification of information that indicates which lines are on the same line, correspond to the same equation or expression, and the like. This enables the subsequent steps to adjust, merge or otherwise identify differentiations between the text.

Thus, based on Step 504, engine 200 can perform Step 506 and segment the text into text snippets. In some embodiments, Step 506 can leverage the ML/AI (e.g., BiLSTM) techniques discussed above to identify line breaks within the text.

In Step 508, engine 200 can then adjust the text snippets based on the line breaks so as to delineate or separate text from proceeding and preceding text on adjacent lines. In some embodiments, such adjustment in Step 508 can be performed using any type of known or to be known classifier, such as, but not limited to, BiLSTM-CRF, CRF, and the like.

In Step 510, engine 200 can then perform line merging operations when it is determined that adjacently located lines of text correspond to the same information (e.g., expression, for example). As result, engine 200 can then determine a list of text snippets.

Thus, according to some embodiments, based on Steps 502-512 of FIG. 5, engine 200 can segment the text of the ERD into text snippets based on line breaks and adjust those segments. In some embodiments, as discussed above, the adjustment can include finding new line break point in the original line, and whether to merge consecutive lines. The reason for line segmentation is that human revision on the text could involve error in the process. A non-limiting example can involve that the first item of the list is put together with the list title in the same line, but actually that first list item is supposed to appear in the next line.

For example, in document 300 of FIG. 3, for the line starting with "Byte 6-7", the fraction starting from the word "Range" in that line should be put into next line. The reason for merge these lines is to combine related information together, which makes the information of each text snippet a complete, informative unit. As discussed below, this enables the facilitation of further operations on the parsed tree of the document, where the processing can be focused at one text snippet (e.g., one unit), rather than two snippets, which can increase efficiency, accuracy and reduce resource drain of the operating system.

Figure 5B:
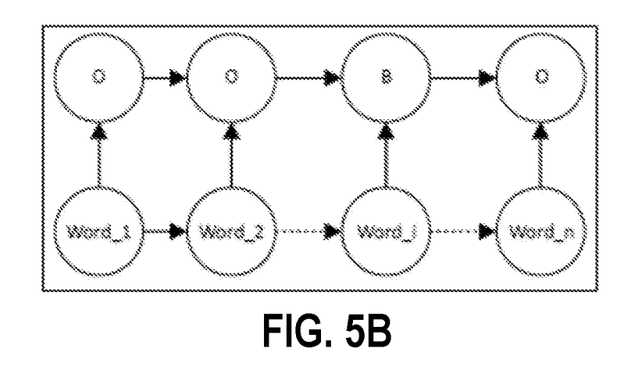
FIGS. 5B-5C illustrate non-limiting example embodiments of the processing of the disclosed framework according to some embodiments of the present disclosure.

According to some embodiment, the operational tasks for both segmentation and line merging can be considered a sequence labeling task. For example, FIG. 5B depicts an example modeling of the segmentation of Step 506 on word level, with the "B" tag indicating a breaking point before the word, and the "O" meaning no operation.

Figure 5C:
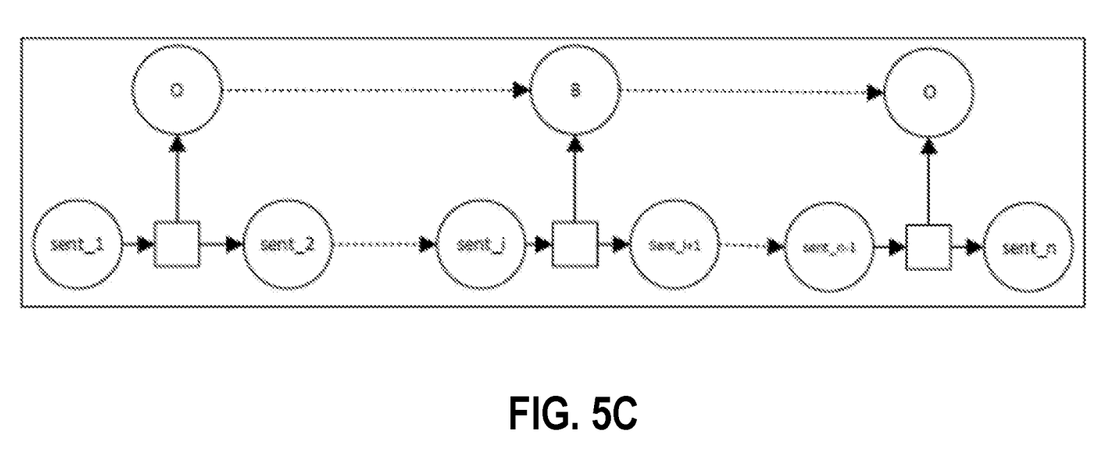

In another example, FIG. 5C also shows the lines merge task of Step 510, which takes in a pair of consecutive sentences and predicts if they are connected, which is depicted in FIG. 5C with sentence i and sentence i+1 are connected.

Turning back to FIG. 4, having performed the text snippet identification and adjustment of Step 404, Process 400 proceeds to Steps 406-414 where engine 200 performs Phase II processing on the result of the Phase I results (e.g., text snippets, as discussed above), where a hierarchy structure will be rebuilt. The hierarchy structure (or tree structure) of the ERD is crucial to the document structure analysis, as such structure can be used for down-streaming tasks.

In Step 406, engine 200 performs adaptive embedding based on an applied language or feature (n-dimensional) vector modelling. According to some embodiments, engine 200 can utilize any type of known or to be known type embedding, including, but not limited to, character level, word level, sentence level, document level, and the like, or any other type of embedding for a language processing task(s).

Figure 6:
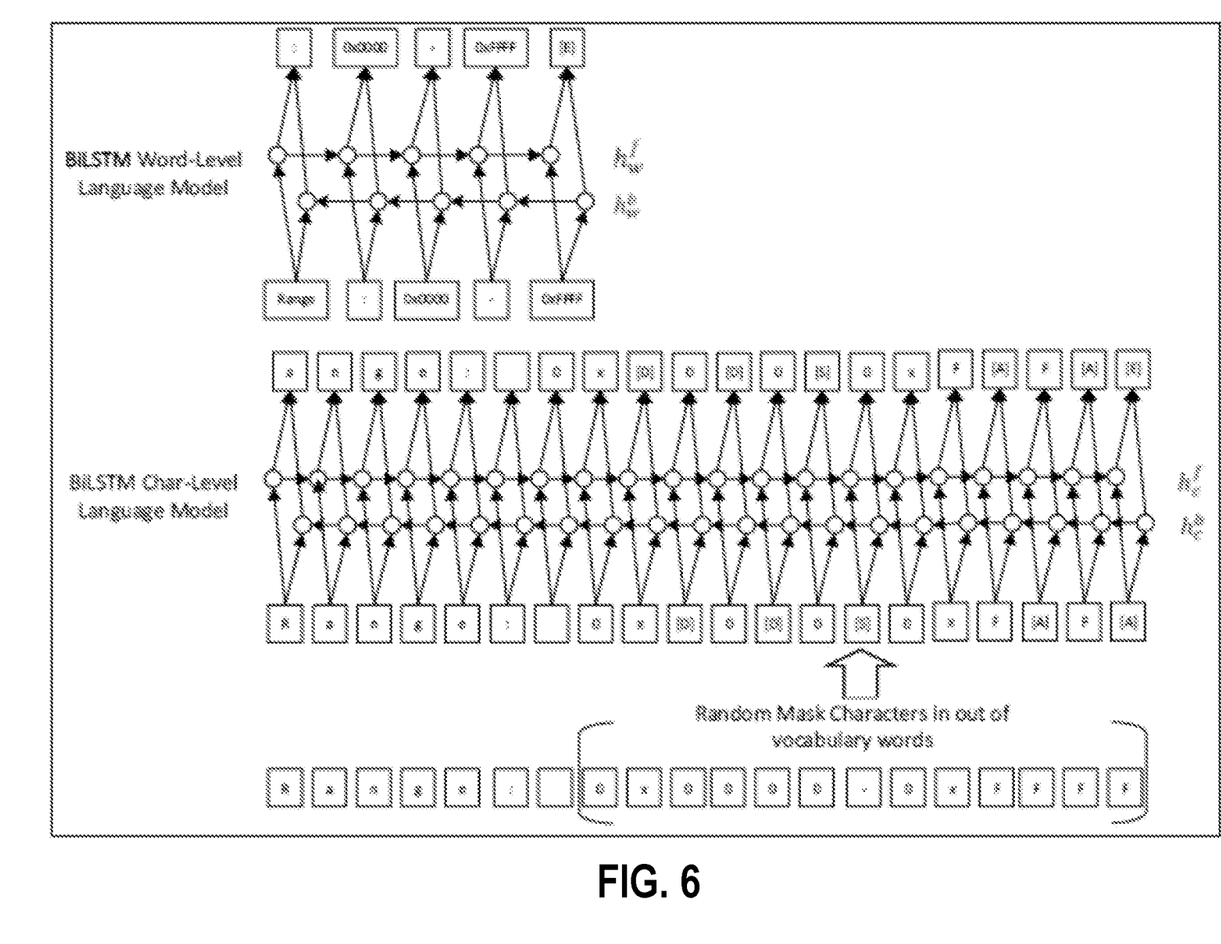
FIG. 6 illustrates a non-limiting example embodiment of the processing of the disclosed framework according to some embodiments of the present disclosure.

According to some embodiments, Step 406 can utilize a word-level BiLSTM neural model and character-level BiLSTM neural model for text snippet of requirement document. An example of this is depicted in FIG. 6.

In some embodiments, utilizing both the BiLSTM word level and character-level models, a final embedding of the text snippet can be stacked of hidden vectors. This can be depicted in the Eq. 1:

$$v = (a \cdot v_{word}, (1-a) \cdot v_{char}, v_f)$$
$$v_{word} = (h_w^f, h_w^b)$$
$$v_{char} = (h_c^f, h_c^b)$$
$$a = \frac{1}{1+e^{-b_0 * OOV-ratio-b_1}}, b_0 = 25, b_1 = -12.5,$$

Eq. 1.

As Eq. 1 shows, v is the embedding for text snippet, stacked by vword embedding from word-level neural model, and $v_{char}$ is the embedding from character-level neural model. Respectively, Vword and $v_{char}$ are composed of the hidden vector of BiLSTM model, with superscript f for forward, b for backward.

According to some embodiments, the hidden vector can be considered to have encoded information of the entire chain. $v_f$ is the feature vector extracted from the text snippet, which will be discussed infra.

ERDs contain a large quantity of number, symbol and domain-specific terms; therefore, engine 200 can implement an adaptive strategy to balance between word-level embeddings and character-level embeddings for the final embedding of a text snippet.

According to some embodiments, an OOV-ratio and parameter a can be calculated as EQ. 1 indicates. OOV-ratio is the percentage of OOV words in the text snippet. In document 300 of FIG. 3, "Range" is an in-dictionary word, and 0x0000 and 0xFFFF are out of vocabulary words. Thus, engine 200 can operate to calculate the length of the OOV part, and determine the percentage of OOV in the entire text snippet. In some embodiments, engine 20 can execute a logistic regression function/model to control the mapping between α and OOV-ratio. In some embodiments, if OOV-ratio is 0.1, α will then almost be 1 (to a predetermined level), which be based on the word-level embedding; and in contrast, while α is approaching value 0, the OOV-ratio is 0.9.

According to some embodiments, a word-level BiLSTM model can be utilized where each word is casted as 1-of-k vector, and fed into a BiLSTM sequence model with forward and backward LSTM units. As a result, the output is to predict a next word with a Softmax function and loss function with a cross entropy between prediction and the ground-truth.

In some embodiments, a character-level BiLSTM model can follow a similar process, with a data augmentation approach additionally leveraged that is adopted to increase the robustness of the model. Different from the word-level neural model, each character in the character-level BiLSTM model does not bear much semantic information. In the OOV words, different digits or symbols could bear similar embedding. Entity names could have different surface form, but should have similar embedding—for example, EPB_123 and ESP_456 are both valid signal names.

In some embodiment, the data augmentation implementation enables the creation of new instances for embedding training. In some embodiments, this can be performed by randomly casting characters into abstract symbols. For example, engine 200 can cast alphabet character as [A], digit as [D], punctuation as [S]. For example: EPB 123=>E [A] B [S] 1 [D] 3, ESP_456=>E [A] P [S] 4 [D] 6. Thus, different entities could be casted into forms that look more similar, and eventually make the character embedding more adaptable.

According to some embodiments, with regard to a feature vector processing of Step 406, vf (from EQ. 1) can be the feature vector extracted from the text snippet, which can be dedicated for document structure information. The structural information is an indication of a recursive structure. For example, it is typical that if this text snippet contains the first line of the paragraph, it could contain a paragraph title, and may be put as the top recursive level. If the text snippet is prefixed with a few white space, this may indicate that this text snippet is in a sublevel (e.g., a child of its parent text snippet).

According to some embodiments, the below Table 1 provides an example listing of typical features of an ERD. These features are linguistic features, or can be considered as rule based features on the textual content. Such rules can be organized as Boolean, integer, enumeration or string value, which can be converted computationally in an efficient manner into a vector. For example, given 5-gram prefix string, it can be determined to be a concatenation of 5 1-of-k character embedding.

TABLE 1

| Feature Name | type | Description |
| --- | --- | --- |
| First_line | boolean | Whether the text snippet is the first line of a paragraph |
| 1-gram prefix | string | First character of the text snippet |
| 2-gram prefix | string | First 2 characters of the text snippet |
| 3-gram prefix | string | First 3 characters of the text snippet |
| 4-gram prefix | string | First 4 characters of the text snippet |
| 5-gram prefix | ngram | First 5 characters of the text snippet |
| Leading white space | integer | The number of leading white space in the text snippet |
| First none white space punctuation | string | The first none white space punctuation, which could be indication of sublevel, for example "—", "*", "=", ">", etc. |

Continuing with Process 400, having performed the adaptive embedding of Step 406, Process 400 can proceed to Step 408 where a document structure building algorithm is executed by engine 200. According to some embodiments, engine 200 can predict a relationship (or relation, used interchangeably) between text snippets (e.g., classify them as a parent-child relation, sibling-child relation or none-relation, for example), as discussed below. As outlined in Algorithm 1 below, engine 200 can execute such predictive processing via function $f(*,*)$.

According to some embodiments, the document structure can be rebuilt given the algorithm described below (Algorithm 1). According to some embodiments, given that a requirement r is composed of n consecutive text snippets $x_i$, i=1, 2, ... n, with each snippet having been extracted out as embedding $v_i$, i=1, 2, ... n. According to some embodiments, as evident from the discussion herein, the task of Step 408 is to build up a tree, where text snippet $x_i$ is the node in the tree.

Algorithm 1 (for document recursive structure building):

```
Input: r = x_i, i = 1,2, ... n sequence of n text snippets
Output: tree(r)
Process:
    foreach i in n:
        foreach j in range(0, i-1):
            rel = f(x_i, x_j)
            If rel == Parent-Child Relation:
                rel_0 = rel
                foreach sibling c_k in Children(x_j) :
                    rel_k = f(x_i, c_k)
                rel = majority_vote(rel_0, rel_1, ... rel_k)
                If rel == Parent-Child Relation:
                    Attach x_i to x_j
                    Break to outer loop for i
            elseif rel == Sibling Relation:
                rel_0 = f(x_i, Parent(x_j))
                foreach sibling s_k in Siblings(x_j) :
                    rel_k = f(x_i, s_k)
                rel = majority_vote(rel_0, rel_1, ... rel_k)
                If rel == Parent-Child Relation:
                    Attach x_i to Parent(x_j)
                    Break to outer loop for i
            else:
                pass, continue inner loop for j
        if x_i is still not attached to some node in the current tree:
            Attach x_i to root
    Done
```

According to some embodiments, the tree has a root with empty content, whose direct children are the first level in the recursive tree. In some embodiments, Algorithm 1 can be conducted recursively.

In some embodiments, one key function in Algorithm 1 is $f(x_i, x_j)$, which takes in two text snippets, where $x_i$ is the text snippet to be added to the tree, and $x_j$ is in a node already attached into the tree. As mentioned above, this relationship can be classified as one of parent-child, sibling or None-relationship. Engine 200 can use this function to check if the current text snippet can or should be attached as a child into some node of the tree that is being built. Instead of only comparing the relationship of two nodes, Algorithm 1 enables engine 200 to compare the $x_i$ with a subtree, including parent and children, to check whether $x_i$ could fit into the subtree or not.

According to some embodiments, in the deep learning framework, each text snippet xi can be converted as embedding $v_i$, then $f(x_i, x_j)$ can be naturally considered as $f(v_i, v_j)$. Thus, based on the discussion herein, the disclosed operations can be performed as a learning task modeled as a classification task to learn, determine or otherwise identify the function $f(v_i, v_j)$, taking two embeddings and predicting their relationship.

Continuing with Process 400, having performed the operational processing of Step 408, Process 400 proceeds to Step 410 where engine 200 can select and annotate prototypical requirements.

According to some embodiments, to train the model $f(x_i, x_j)$, requirement texts need to be annotated. In some embodiments, instead of annotating pair of text snippets, engine 200 can utilize an annotator so that the more accurate annotation can be given after analyzing the context. The annotator can be required to annotate the recursive level of the text snippet, and then these recursive levels can be converted as a pairwise relationship of the text snippets.

According to some embodiments, based on the high redundancy in ERD text, engine 200 can execute a MMR algorithm/program to select the requirement text that is representative as a prototype. As discussed herein, "prototype" refers to instance that is most representative of a group of instances (e.g., text snippets can have a prototype, and requirements (e.g., a sequence of text snippets) can also have a prototype).

Figure 7:
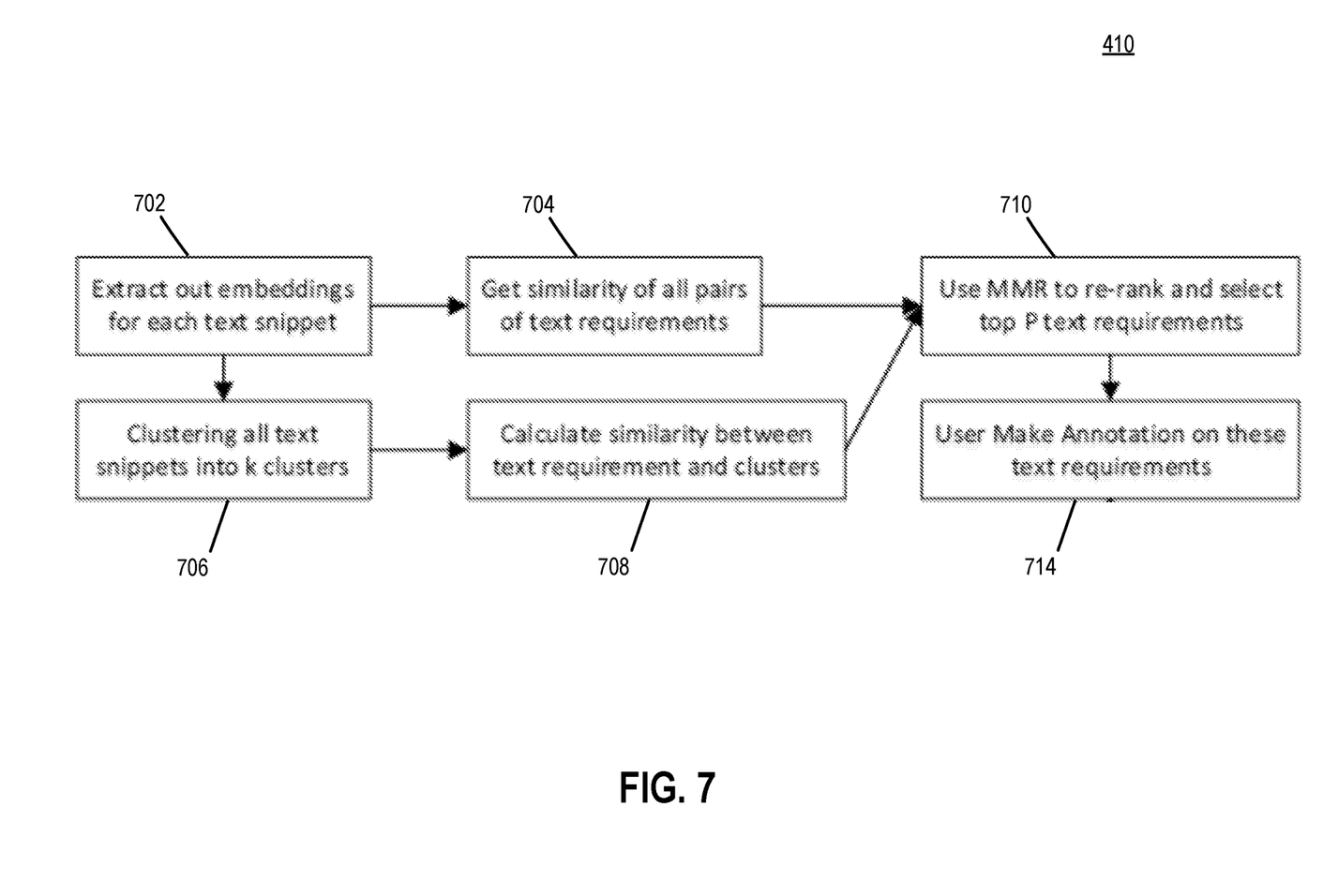
FIG. 7 illustrates an exemplary data flow according to some embodiments of the present disclosure.

FIG. 7, and Steps 702-714, provide a workflow for performing the selective, annotative prototypical requirement processing performed in Step 410.

In Step 702, engine 200 extracts the embedding from each text snippet, and in Step 706, engine 200 generates k clusters based on the text of the text snippets. In some embodiments, users can be involved in the clustering process, which can be with regard to deciding what could be the optimal value fork (e.g., the number of clusters).

In some embodiments, Step 704 can be performed based on Step 702, whereby a similarity of all pairs of text requirements can be determined. This can be based on MMR processing, as discussed herein.

Given the embedding of k clusters of text snippets (as in Step 706), the processing can proceed to Step 708 where engine 200 can calculate, for each cluster, the centroid embedding as Prototypes (k Prototype) (e.g., the similarity between text requirements and clusters). According to some embodiments, each prototype can represent the embedding of a group of text snippets that can appear in the requirement. Then, the requirement selection needs to select out the requirement that has a similarity (at least to a threshold level) between the requirement and all the prototypes, meanwhile keep diversity among the selected requirements.

Thus, engine 200 can perform Step 710 based on Steps 704 and 708's processing, where MMR is adopted here to weigh in both the $Sim_{prototype}$ and $Sim_{requirement}$.

According to some embodiments, MMR can be conducted as follows:

$$\text{MMR} = \text{Argmax}_{r_i \in R \setminus S}[\lambda \text{Sim}_{prototype}(r_i, \text{Prototypes}) - (1-\lambda)\max_{r_j \in S}\text{Sim}_{requirement}(r_i, r_j)], \quad \text{EQ. 2,}$$

where $r_i$, i=1, 2, ... m: represent the i-th requirement, totally m requirement documents; S: set of requirement that are already been selected; R\ S: set of requirements that are not in S, but are contained in the entire requirement document set; $\lambda$: parameter between [0,1], to balance the relationship between the two similarities; $\text{Sim}_{prototype}$(ri, Prototypes): similarity between requirement ri and Prototypes; Prototypes: the prototypes of the text snippets; and $\text{Sim}_{requirement}$ ($r_i$, $r_j$): similarity between requirement $r_i$ and $r_j$.

According to some embodiments, the MMR approach focuses on the two similarity functions: $\text{Sim}_{prototype}$ and $\text{Sim}_{requirement}$ (from Steps 704 and 708). According to some embodiments, the calculation of these similarities are described below.

With regard to the calculation of $\text{Sim}_{prototype}$, suppose there are K Prototypes, and each is represented as embedding (vector). First, AssignProt function is defined to find the prototype most closely to the input embedding of text snippet $x_t^i$. Here, $x_t^i$ represents the t-th text snippet in the i-th requirement document.

$$\text{AssignProt}(x_t^i) = \text{argmax}_k \text{Sim}(x_t^i, \text{Prototype}_k), \quad \text{EQ. 3.}$$

Then, the indicator function (*) is defined, which can be 1 if input $x_t^i$ is assigned to k-th prototype.

$$I(x_z^i, k) = \begin{cases} 1, & \text{if } \text{AssignProt}(x_t^i) == k \\ 0, & \text{otherwise} \end{cases}, \quad \text{EQ. 4.}$$

Given EQ. 4, the similarity can be determined between i-th requirement $r_i$ and the K prototypes as follows:

$$\text{Sim}_{prototype}(r_i, \text{Prototypes}) = \sum_{k=0}^{K} \log\left(1 + \alpha \cdot \left(\sum_{x_t^i \in r_i} \text{Sim}(x_t^i, \text{Prototype}_k) \cdot I(x_t^i, k)\right)\right) \quad \text{EQ. 5.}$$

Here, $\text{Sim}(x_t^i, \text{Prototype}_k)$ is the dot product of two embeddings, and a is a parameter to control the scale of the value. For each prototype, EQ. 5 sums up the similarities of the text snippets that can be assigned to that prototype, and then uses a log function to scale down the value. As a result of these computations, the similarity between the requirement ri and all different prototypes are summed up.

With regard to the $\text{Sim}_{requirement}$ calculation, given the indicator function, the counting function Count(*) can be defined as follows, which counts the number of text snippets in i-th requirement that can be assigned to k-th prototype, based on the definition of indicator function I(*).

$$\text{Count}(r_i, k) = \sum_{x_t^i \in r_i} I(x_t^i, k), r_i = (x_1^i, x_2^i, \ldots x_n^i), \quad \text{EQ. 6.}$$

The similarity between two requirements are defined as follows, which sums up the similarities of text snippets that can be assigned to the same prototype, divided by a log-discounted norm value from the Count(*) function.

$$\text{Sim}_{requirement}(r_i, r_j) = \sum_{k=0}^{K} \sum_{x_t^i \in r_i, x_s^j \in r_j} \frac{\text{Sim}(x_t^i, x_s^j) \cdot I(x_t^i, k) \cdot I(x_s^j, k)}{\log(1 + \text{Count}(r_i, k)) \cdot \log(1 + \text{Count}(r_j, k))} \quad \text{EQ. 7.}$$

Thus, in Step 710, given the calculation of $\text{Sim}_{prototype}$ and $\text{Sim}_{requirement}$ engine 200 can use MMR to select the top P text requirements that are highly related to the prototypes in the text snippets, meanwhile keeping variety in the selection results (at least to a threshold level). In some embodiments, Step 712 can be performed which enables the fine-tuning of the processing by user provided adjustments or annotations to the text requirements.

Thus, turning back to Process 400, as a result of Step 410's processing (e.g., Steps 702-712), engine 200 can select the prototypical requirement based on the text snippet prototypes, whereby engine 200 can perform annotation on the requirement texts. In some embodiments, engine 200 can perform Step 412 where the selection and annotation processing of Step 410 can be fed to a pairwise snippet function for training.

Process 400 proceeds to and concludes with Step 414 where engine 200 can execute a (trained) pairwise text snippet function that is used to rebuild the hierarchy structure of the ERD. In some embodiments, information related to the rebuild can be fed back to Step 412 for further training.

According to some embodiments, therefore, the processing of Process 400 enables a two-phase framework for document structure parsing on requirement text of an ERD. As discussed above, engine 200 can perform/execute an adaptive embedding approach to handle an OOV problem in an ERD, then perform/execute a hierarchy document structure rebuilding approach to build up the tree structure based on raw text by using a pairwise text snippets prediction function/model. According to some embodiments, as discussed herein, the disclosed framework implements a prototypical requirement selection strategy to select representative and diversified requirements from text snippets prototypes, which reduces the redundancy and alleviates annotation efforts.

Figure 8:
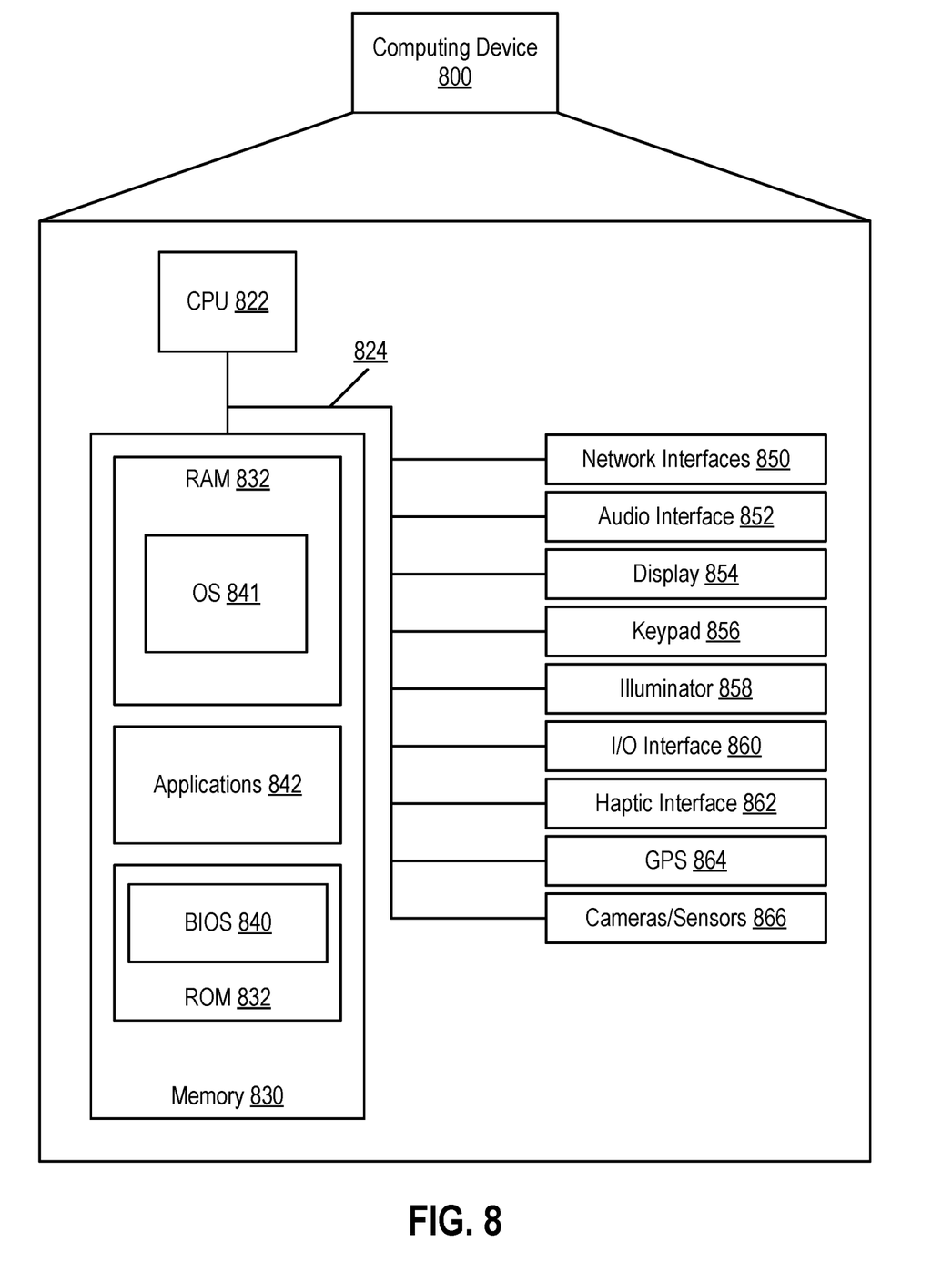
FIG. 8 is a block diagram illustrating a computing device showing an example of a device used in various embodiments of the present disclosure.

FIG. 8 is a block diagram illustrating a computing device 800 (e.g., UE 800, as discussed above) showing an example of a client device or server device used in the various embodiments of the disclosure.

The computing device 800 may include more or fewer components than those shown in FIG. 8, depending on the deployment or usage of the device 800. For example, a server computing device, such as a rack-mounted server, may not include audio interfaces 852, displays 854, keypads 856, illuminators 858, haptic interfaces 862, GPS receivers 864, or cameras/sensors 866. Some devices may include additional components not shown, such as GPU devices, cryptographic co-processors, AI accelerators, or other peripheral devices.

As shown in FIG. 8, the device 800 includes a central processing unit (CPU) 822 in communication with a mass memory 830 via a bus 824. The computing device 800 also includes one or more network interfaces 850, an audio interface 852, a display 854, a keypad 856, an illuminator 858, an input/output interface 860, a haptic interface 862, an optional GPS receiver 864 (and/or an interchangeable or additional GNSS receiver) and a camera(s) or other optical, thermal, or electromagnetic sensors 866. Device 800 can include one camera/sensor 866 or a plurality of cameras/sensors 866. The positioning of the camera(s)/sensor(s) 866 on the device 800 can change per device 800 model, per device 800 capabilities, and the like, or some combination thereof.

In some embodiments, the CPU 822 may comprise a general-purpose CPU. The CPU 822 may comprise a single-core or multiple-core CPU. The CPU 822 may comprise a system-on-a-chip (SoC) or a similar embedded system. In some embodiments, a GPU may be used in place of, or in combination with, a CPU 822. Mass memory 830 may comprise a dynamic random-access memory (DRAM) device, a static random-access memory device (SRAM), or a Flash (e.g., NAND Flash) memory device. In some embodiments, mass memory 830 may comprise a combination of such memory types. In one embodiment, the bus 824 may comprise a Peripheral Component Interconnect Express (PCIe) bus. In some embodiments, the bus 824 may comprise multiple busses instead of a single bus.

Mass memory 830 illustrates another example of computer storage media for the storage of information such as computer-readable instructions, data structures, program modules, or other data. Mass memory 830 stores a basic input/output system ("BIOS") 840 for controlling the low-level operation of the computing device 800. The mass memory also stores an operating system 841 for controlling the operation of the computing device 800.

Applications 842 may include computer-executable instructions which, when executed by the computing device 800, perform any of the methods (or portions of the methods) described previously in the description of the preceding Figures. In some embodiments, the software or programs implementing the method embodiments can be read from a hard disk drive (not illustrated) and temporarily stored in RAM 832 by CPU 822. CPU 822 may then read the software or data from RAM 832, process them, and store them to RAM 832 again.

The computing device 800 may optionally communicate with a base station (not shown) or directly with another computing device. Network interface 850 is sometimes known as a transceiver, transceiving device, or network interface card (NIC).

The audio interface 852 produces and receives audio signals such as the sound of a human voice. For example, the audio interface 852 may be coupled to a speaker and microphone (not shown) to enable telecommunication with others or generate an audio acknowledgment for some action. Display 854 may be a liquid crystal display (LCD), gas plasma, light-emitting diode (LED), or any other type of display used with a computing device. Display 854 may also include a touch-sensitive screen arranged to receive input from an object such as a stylus or a digit from a human hand.

Keypad 856 may comprise any input device arranged to receive input from a user. Illuminator 858 may provide a status indication or provide light.

The computing device 800 also comprises an input/output interface 860 for communicating with external devices, using communication technologies, such as USB, infrared, Bluetooth™, or the like. The haptic interface 862 provides tactile feedback to a user of the client device.

The optional GPS transceiver 864 can determine the physical coordinates of the computing device 800 on the surface of the Earth, which typically outputs a location as latitude and longitude values. GPS transceiver 864 can also employ other geo-positioning mechanisms, including, but not limited to, triangulation, assisted GPS (AGPS), E-OTD, CI, SAI, ETA, BSS, or the like, to further determine the physical location of the computing device 800 on the surface of the Earth. In one embodiment, however, the computing device 800 may communicate through other components, provide other information that may be employed to determine a physical location of the device, including, for example, a MAC address, IP address, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "data owner", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computer-implemented method for document structure rebuilding, comprising:
 identifying, by a processor, an electronic requirement document (ERD) comprising text;
 analyzing, by the processor, the ERD to determine a listing of text snippets within the text;
 performing adaptive embedding, by the processor, on the listing of text snippets, the adaptive embedding comprising executing at least one neural model to determine an embedding for each text snippet;
 executing, by the processor, a document recursive structure building algorithm based on the determined embeddings to determine a tree structure for the ERD;
 determining, by the processor, a set of similarity values of each embedding, the set of similarity values corresponding to a prototype factor and a requirement factor, the prototype factor representing a group of text snippets, the requirement factor representing a sequence of text snippets;
 clustering, by the processor, each embedding based set of similarity values; and
 rebuilding, by the processor, the ERD based on the clustered embeddings and determined tree structure.

2. The method of claim 1, further comprising:
 analyzing the text of the ERD, and identifying line breaks within the text;
 determining whether an adjustment to each text snippet is required based on the identified line breaks;
 determining whether line merging of text snippets is required based on line breaks and the determined adjustments; and
 identifying text segments based on the adjustment and merging determinations, wherein the listing of text snippets is based on the identified text segments.

3. The method of claim 2, wherein a text snippet is merged with adjacently located text snippet based on a determination that the line break does not delineate a separate operation, wherein the merged snippets correspond to a same operation.

4. The method of claim 1, wherein the determination of the embedding for each text snippet is based on an out-of-vocabulary (OOV) ratio that indicates a value of OOV words in a respective text snippet, wherein the value of the OOV corresponds to a type of neural model executed by the device.

5. The method of claim 1, wherein the determined embedding for each text snippet comprises a stack of hidden vectors from the at least one neural model, wherein each hidden vector comprises encoded information related to a respective text snippet.

6. The method of claim 1, wherein the at least one neural model comprises at least one of a word-level neural model and character-level neural model.

7. The method of claim 6, wherein the at least one neural model is a Bidirectional Long short-term memory—conditional random field (BiLSTM) neural model.

8. The method of claim 1, further comprising:
 analyzing each embedding for the listing of text snippets;
 determining a relationship between each embedding; and
 building the tree structure of the ERD based on the determination relationships.

9. The method of claim 8, wherein the relationship is at least one of parent-child, sibling or None-relationship.

10. The method of claim 1, further comprising:
 executing a maximal margin relevance (MMR) algorithm, based on the set of similarity values, with the embeddings as the input;
 identifying, via the MMR execution, a prototypical requirement based on the prototype factor and the requirement factor; and
 executing a pairwise text snippet function based on the prototypical requirement, such that the text of the ERD is annotated according at least to the rebuilding step.

11. A non-transitory computer-readable storage medium tangibly encoded with computer-executable instructions, that when executed by a processor, perform a method for document structure rebuilding comprising steps of:
 identifying an electronic requirement document (ERD) comprising text;
 determining based on an analysis of the ERD, a listing of text snippets within the text;
 determining an out-of-vocabulary (OOV) ratio that indicates a value of OOV words in a respective text snippet;
 executing at least one neural model on the listing of text snippets to determine an embedding for each text snippet;
 executing a document recursive structure building algorithm based on the determined embeddings for the listing of text snippets, the execution causing a determination of a tree structure for the ERD;
 determining a prototype similarity value and a requirement similarity value for the determined embeddings;
 determining a maximal margin relevance (MMR) value based on the prototype similarity value and the requirement similarity value; and
 rebuilding the ERD based on the MMR determination and determined tree structure.

12. The non-transitory computer-readable storage medium of claim 11, wherein the instructions further cause the processor to perform:
 analyzing the text of the ERD, and identifying line breaks within the text;
 determining whether an adjustment to each text snippet is required based on the identified line breaks;
 determining whether line merging of text snippets is required based on line breaks and the determined adjustments; and
 identifying text segments based on the adjustment and merging determinations, wherein the listing of text snippets is based on the identified text segments.

13. The non-transitory computer-readable storage medium of claim 12, wherein a text snippet is merged with adjacently located text snippet based on a determination that the line break does not delineate a separate operation, wherein the merged snippets correspond to a same operation.

14. The non-transitory computer-readable storage medium of claim 11, wherein the determined embedding for each text snippet comprises a stack of hidden vectors from the at least one neural model, wherein each hidden vector comprises encoded information related to a respective text snippet.

15. The non-transitory computer-readable storage medium of claim 11, wherein the at least one neural model comprises at least one of a word-level neural model and character-level neural model, wherein the at least one neural model is a Bidirectional Long short-term memory—conditional random field (BiLSTM) neural model.

16. The non-transitory computer-readable storage medium of claim 11, wherein the instructions further cause the processor to perform:

analyzing each embedding for the listing of text snippets; and determining a relationship between each embedding, wherein the relationship is at least one of parent-child, sibling or None-relationship, wherein the ERD is built based on the determination relationships.

17. A system comprising:
a processor programmed to:
  identify an electronic requirement document (ERD) comprising text;
  analyze the ERD to determine a listing of text snippets within the text;
  execute a word-level neural model and a character-level neural model on the listing of text snippets to determine an embedding for each text snippet;
  determine, based at least in part on determined relationships between each embedding, a tree structure for the ERD;
  determine a prototype similarity value and a requirement similarity value for the determined embeddings;
  determine a maximal margin relevance (MMR) value based on the prototype similarity value and the requirement similarity value; and
  rebuild the ERD based on the MMR determination and determined tree structure.

18. The system of claim 17, wherein the processor is further programmed to:
  determine, for each text snippet, a set of hidden vectors based on execution of at least one of the word-level neural model and character-level neural model, wherein each hidden vector comprises encoded information related to a respective text snippet, wherein the determined embedding for each text snippet comprises the set of hidden vectors.

19. The system of claim 17, wherein the each neural model is a version of a Bidirectional Long short-term memory—conditional random field (BiLSTM) neural model.

20. The system of claim 17, wherein the processor is further programmed to:
  execute a document recursive structure building algorithm based on the determined embeddings for the listing of text snippets, wherein the tree structure for the ERD is based on the execution of the document recursive structure building algorithm, wherein the relationship is at least one of parent-child, sibling or None-relationship, wherein the ERD is built based on the determination relationships.

* * * * *